US011345976B2

(12) United States Patent
Gauthier et al.

(10) Patent No.: US 11,345,976 B2
(45) Date of Patent: May 31, 2022

(54) RECOVERY OF SCANDIUM AND VANADIUM VALUES FROM FEEDSTOCKS USING ULTRASOUND-ASSISTED EXTRACTION

(71) Applicant: CENTRAL AMERICA NICKEL INC., Montreal (CA)

(72) Inventors: Pierre Gauthier, Montréal (CA); Enrico Di Cesare, Pierrefonds (CA)

(73) Assignee: CENTRAL AMERICA NICKEL INC., Montreal (CA)

( * ) Notice: Subject to any disclaimer, the term of this patent is extended or adjusted under 35 U.S.C. 154(b) by 287 days.

(21) Appl. No.: 16/624,157

(22) PCT Filed: Jun. 22, 2018

(86) PCT No.: PCT/CA2018/050772
§ 371 (c)(1),
(2) Date: Dec. 18, 2019

(87) PCT Pub. No.: WO2018/232528
PCT Pub. Date: Dec. 27, 2018

(65) Prior Publication Data
US 2020/0224292 A1    Jul. 16, 2020

Related U.S. Application Data

(60) Provisional application No. 62/523,836, filed on Jun. 23, 2017.

(51) Int. Cl.
| C22B 34/00 | (2006.01) |
| C22B 34/22 | (2006.01) |
| C22B 3/08 | (2006.01) |
| C22B 3/22 | (2006.01) |
| C22B 3/42 | (2006.01) |
| C22B 59/00 | (2006.01) |

(52) U.S. Cl.
CPC ............. *C22B 34/22* (2013.01); *C22B 3/08* (2013.01); *C22B 3/22* (2013.01); *C22B 3/42* (2013.01); *C22B 59/00* (2013.01)

(58) Field of Classification Search
CPC .. C22B 34/22; C22B 3/44; C22B 3/08; C22B 3/22; C22B 3/42; C22B 59/00
See application file for complete search history.

(56) References Cited

U.S. PATENT DOCUMENTS

| 2012/0111150 A1* | 5/2012 | Marafi | ............... C22B 7/007 75/622 |
| 2016/0145717 A1* | 5/2016 | Gabor | ............... C22B 3/20 435/262 |
| 2019/0040494 A1* | 2/2019 | Emmert | ............... C22B 3/44 |

FOREIGN PATENT DOCUMENTS

| CN | 104152723 | 11/2014 |
| CN | 204550689 | 8/2015 |
| CN | 106191447 | 12/2016 |
| RU | 2011147849 | 5/2013 |

OTHER PUBLICATIONS

Narayana, et al., "Leaching of Metals From Ores With Ultrasound," *Mineral Processing and Extractive Metallurgy Review*, 16: 4, 239-259, 1997.
Wang & Liu, "Physical and Chemical Properties of Sintering Red Mud and Bayer Red Mud and the Implications for Beneficial Utilization," *Materials*, 5: 1800-1810, 2012.
Hepworth, et al., "Recovery of Vanadium, Nickel, and Carbon From Orinoco Crudes Via Flexicoking," Fuel and Energy Abstracts, 4(38): 104-110, 1997.
International Search Report and Written Opinion Issued in Corresponding PCT Patent Application No. PCT/CA2018/050772, dated Sep. 27, 2018.

* cited by examiner

*Primary Examiner* — Steven J Bos
(74) *Attorney, Agent, or Firm* — Norton Rose Fulbright US LLP

(57) ABSTRACT

The present disclosure broadly relates to a process for recovering scandium and/or vanadium values from various feedstocks. More specifically, but not exclusively, the present disclosure relates to a process for the selective recovery of scandium and/or vanadium values from a feedstock, the process comprising: leaching the feedstock in a sulfuric acid solution while simultaneously sonicating the sulfuric acid solution thereby producing a pregnant solution; and selectively removing scandium and vanadium compounds from the pregnant solution using a solvent extraction process.

19 Claims, 3 Drawing Sheets

RECOVERY OF SCANDIUM AND VANADIUM VALUES FROM FEEDSTOCKS USING ULTRASOUND-ASSISTED EXTRACTION

The present application is a national phase under 35 U.S.C. § 371 of International Application No. PCT/CA2018/050772, filed Jun. 22, 2018, which claims the benefit of priority from U.S. Provisional application No. 62/523,836 filed on Jun. 23, 2017. The contents of each of the referenced applications are incorporated in the present application by reference in their entirety.

FIELD

The present disclosure broadly relates to a process for selectively recovering metal values from various feedstocks. More specifically, but not exclusively, the present disclosure relates to a process for selectively recovering scandium, and/or vanadium values from various feedstocks. More specifically, but not exclusively, the present disclosure relates to a process for recovering scandium and/or vanadium from various feedstocks using an ultrasound assisted extraction process.

BACKGROUND

The recovery of scandium and vanadium from various feed materials such as from limonite, saprolite, serpentine and laterite ores typically calls upon hydrometallurgy, that is the use of an acidic leaching medium. These hydrometallurgical processes are typically very capital expensive in view of the high costs incurred by material requirements as well as the high temperatures and/or pressures required for efficient leaching. Moreover, the efficient recovery of the scandium and vanadium values is often impeded by the presence of magnesium and free silica. The search for new ore deposits as well as the need for improved technologies providing for a more efficient and affordable extraction of the scandium and vanadium values has intensified. In accordance with today's environmental concerns, any new extraction technology should not adversely impact the environment or leave as little an imprint as possible.

The present disclosure refers to a number of documents, the contents of which are specifically incorporated herein by reference in their entirety.

SUMMARY

A solution to the shortcomings of the prior art processes associated with the presence of magnesium and free silica as well as other values has been discovered. Broadly, the solution resides in the discovery that concomitant leaching and sonication initially generates a pregnant solution enriched substantially in scandium and vanadium values.

In an aspect, the present disclosure broadly relates to a process for selectively recovering metal values from various feedstocks. More specifically, but not exclusively, the present disclosure relates to a process for selectively recovering scandium, and/or vanadium values from various feedstocks. More specifically, but not exclusively, the present disclosure relates to a process for recovering scandium and/or vanadium from various feedstocks using an ultrasound assisted extraction process.

In an aspect, the present disclosure relates to a process for the selective recovery of scandium and/or vanadium values from a feedstock, the process comprising: leaching the feedstock in a sulfuric acid solution while simultaneously sonicating the sulfuric acid solution thereby producing a pregnant solution; and selectively removing scandium and vanadium compounds from the pregnant solution.

In an aspect, the present disclosure relates to a process for the selective recovery of scandium and/or vanadium values from a feedstock, the process comprising: leaching the feedstock in a sulfuric acid solution while simultaneously sonicating the sulfuric acid solution thereby producing a pregnant solution; and selectively removing scandium and vanadium compounds from the pregnant solution using a solvent extraction process. In an embodiment of the present disclosure, the solvent extraction process comprises the use of macroporous basic anion-exchange resins for selectively removing the scandium compounds from the pregnant solution. In a further embodiment of the present disclosure, the solvent extraction process comprises the use of an organophosphoric extractant. In yet a further embodiment of the present disclosure, the organophosphoric extractant comprises at least one of P507, P204, P227 and Cyanex 272.

In an embodiment of the present disclosure, the feedstocks comprise materials containing scandium and/or vanadium in various oxidation states. Non-limiting examples of feedstocks comprise limonite, saprolite, serpentine, laterite, hematite, magnetite, wustite, siderite, ankerite and/or taconite materials. Further non-limiting examples comprise industrial wastes and/or industrial by-products (e.g. residues from oil refineries).

In an embodiment of the present disclosure, the sulfuric acid leaching/sonication is performed using an aqueous solution of sulfuric acid having a mass percentage from about 5% v/v $H_2SO_4$ to about 99% v/v $H_2SO_4$. In a further embodiment of the present disclosure, the sulfuric acid leaching/sonication is performed using an aqueous solution of sulfuric acid having a mass percentage from about 10% v/v $H_2SO_4$ to about 99% v/v $H_2SO_4$. In a further embodiment of the present disclosure, the sulfuric acid leaching/sonication is performed using an aqueous solution of sulfuric acid having a mass percentage from about 15% v/v $H_2SO_4$ to about 99% v/v $H_2SO_4$. In a further embodiment of the present disclosure, the sulfuric acid leaching/sonication is performed using an aqueous solution of sulfuric acid having a mass percentage from about 20% v/v $H_2SO_4$ to about 99% v/v $H_2SO_4$. In a further embodiment of the present disclosure, the sulfuric acid leaching/sonication is performed using an aqueous solution of sulfuric acid having a mass percentage from about 25% v/v $H_2SO_4$ to about 99% v/v $H_2SO_4$. In a further embodiment of the present disclosure, the sulfuric acid leaching/sonication is performed using an aqueous solution of sulfuric acid having a mass percentage from about 30% v/v $H_2SO_4$ to about 99% v/v $H_2SO_4$. In a further embodiment of the present disclosure, the sulfuric acid leaching/sonication is performed using an aqueous solution of sulfuric acid having a mass percentage from about 35% v/v $H_2SO_4$ to about 99% v/v $H_2SO_4$. In a further embodiment of the present disclosure, the sulfuric acid leaching/sonication is performed using an aqueous solution of sulfuric acid having a mass percentage from about 40% v/v $H_2SO_4$ to about 99% v/v $H_2SO_4$. In a further embodiment of the present disclosure, the sulfuric acid leaching/sonication is performed using an aqueous solution of sulfuric acid having a mass percentage from about 45% v/v $H_2SO_4$ to about 99% v/v $H_2SO_4$. In a further embodiment of the present disclosure, the sulfuric acid leaching/sonication is performed using an aqueous solution of sulfuric acid having a mass percentage from about 50% v/v $H_2SO_4$ to about 99% v/v $H_2SO_4$.

In an embodiment of the present disclosure, the sulfuric acid leaching/sonication is performed at a frequency ranging from about 10 to about 50 kHz. In a further embodiment of the present disclosure, the sulfuric acid leaching/sonication is performed at a frequency ranging from about 20 to about 30 kHz.

In an embodiment of the present disclosure, the sulfuric acid leaching/sonication is performed over a period ranging from about five (5) minutes up to about sixty (60) minutes. In a further embodiment of the present disclosure, the leaching/sonication is performed over a period ranging from about ten (5) minutes up to about fifty (50) minutes. In a further embodiment of the present disclosure, the leaching/sonication is performed over a period ranging from about fifteen (15) minutes up to about forty (40) minutes. In a further embodiment of the present disclosure, the leaching/sonication is performed over a period ranging from about twenty (20) minutes up to about thirty five (35) minutes.

In an embodiment of the present disclosure, the feedstock material is ground to a particle size of less than about 0.500 millimeter. In a further embodiment of the present disclosure, the feedstock material is ground to a particle size of less than about 0.125 millimeter. In yet a further embodiment of the present disclosure, the feedstock material is ground to a particle size of less than about 0.050 millimeter.

In an embodiment of the present disclosure, the sulfuric acid leaching/sonication is performed at atmospheric pressure at about room temperature.

In an embodiment of the present disclosure, the sulfuric acid leaching/sonication is performed with a solution of sulfuric acid (S) and a mass of ore material (M) having a mass ratio (S-to-M) not exceeding twenty to one (20:1 or 20 kg/kg).

The foregoing and other objects, advantages and features of the present disclosure will become more apparent upon reading of the following non-restrictive description of illustrative embodiments thereof, given by way of example only with reference to the accompanying drawings/figures.

BRIEF DESCRIPTION OF THE DRAWINGS/FIGURES

DETAILED DESCRIPTION

Glossary

Figure 1:
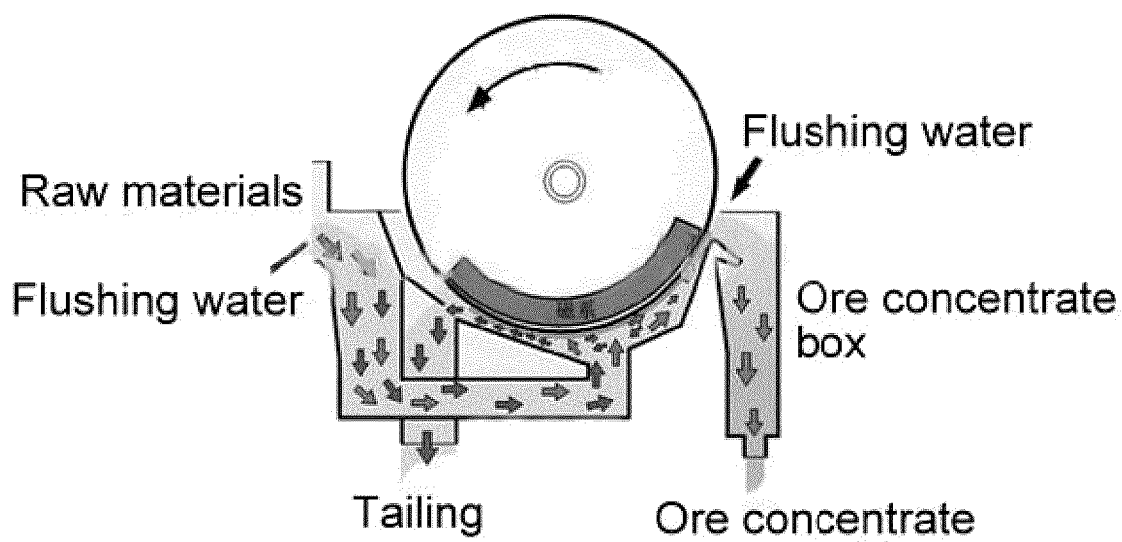
FIG. 1 is an illustration of a magnetic drum separator in accordance with an embodiment of the present disclosure.

In order to provide a clear and consistent understanding of the terms used in the present specification, a number of definitions are provided below. Moreover, unless defined otherwise, all technical and scientific terms as used herein have the same meaning as commonly understood to one of ordinary skill in the art to which this disclosure pertains.

Unless otherwise indicated, the definitions and embodiments described in this and other sections are intended to be applicable to all embodiments and aspects of the application herein described for which they are suitable as would be understood by a person skilled in the art.

The word "a" or "an" when used in conjunction with the term "comprising" in the claims and/or the disclosure may mean "one", but it is also consistent with the meaning of "one or more", "at least one", and "one or more than one" unless the content clearly dictates otherwise. Similarly, the word "another" may mean at least a second or more unless the content clearly dictates otherwise.

As used in this specification and claim(s), the words "comprising" (and any form of comprising, such as "comprise" and "comprises"), "having" (and any form of having, such as "have" and "has"), "including" (and any form of including, such as "include" and "includes") or "containing" (and any form of containing, such as "contain" and "contains"), are inclusive or open-ended and do not exclude additional, unrecited elements or process steps.

As used in this disclosure and claim(s), the word "consisting" and its derivatives, are intended to be close ended terms that specify the presence of stated features, elements, components, groups, integers, and/or steps, and also exclude the presence of other unstated features, elements, components, groups, integers and/or steps.

The term "consisting essentially of", as used herein, is intended to specify the presence of the stated features, elements, components, groups, integers, and/or steps as well as those that do not materially affect the basic and novel characteristic(s) of these features, elements, components, groups, integers, and/or steps.

The terms "about", "substantially" and "approximately" as used herein mean a reasonable amount of deviation of the modified term such that the end result is not significantly changed. These terms of degree should be construed as including a deviation of at least ±1% of the modified term if this deviation would not negate the meaning of the word it modifies.

As used herein, the term "scandium feedstocks" refers to a range of materials containing scandium in various oxidation states and scandium metal such as but not restricted to limonitic, saprolitic and serpentinic ores, scandium slags, industrial wastes and by-products containing scandium such as metallurgical slags from iron making and steel making.

As used herein, the term "vanadium feedstocks" refers to a range of materials containing vanadium in various oxidation states and vanadium metal such as but not restricted to limonitic, saprolitic and serpentinic ores, scandium slags, industrial wastes and by-products containing scandium such as metallurgical slags from iron making and steel making.

As used herein, the term "sulfuric acid digestion" broadly refers to the digestion of a solid with sulfuric acid having a concentration ranging from about 5% v/v to about 100% v/v.

The term "substantially" as used herein with reference to the process steps disclosed herein means that the process steps proceed to an extent that conversion or recovery of the material is maximized. For example, with reference to recovery of a given metallic value (e.g. scandium and/or vanadium), recovery means that at least 60% of the value is recovered.

In an embodiment of the present disclosure, the ultrasound-assisted extraction process comprises the concentration by gravity and/or magnetic extraction and leaching/sonication of scandium and/or vanadium valuables from a feedstock. In an embodiment of the present disclosure, the leaching is performed using sulfuric acid under sonication. In an embodiment, the mass percentage of sulfuric acid used during this step ranges from about 5% v/v $H_2SO_4$ to about 100% v/v $H_2SO_4$. In a further embodiment, the mass percentage of sulfuric acid ranges from about 10% v/v $H_2SO_4$ to about 99% v/v $H_2SO_4$. In a further embodiment, the mass percentage of sulfuric acid ranges from about 15% v/v $H_2SO_4$ to about 99% v/v $H_2SO_4$. In a further embodiment, the mass percentage of sulfuric acid ranges from about 20% v/v $H_2SO_4$ to about 99% v/v $H_2SO_4$. In a further embodiment, the mass percentage of sulfuric acid ranges from about 25% v/v $H_2SO_4$ to about 99% v/v $H_2SO_4$. In a further embodiment, the mass percentage of sulfuric acid ranges from about 30% v/v $H_2SO_4$ to about 99% v/v $H_2SO_4$. In a further embodiment, the mass percentage of sulfuric acid ranges from about 35% v/v $H_2SO_4$ to about 99% v/v $H_2SO_4$. In a further embodiment, the mass percentage of sulfuric acid ranges from about 40% v/v $H_2SO_4$ to about 99% v/v $H_2SO_4$. In a further embodiment, the mass percentage of sulfuric acid ranges from about 45% v/v $H_2SO_4$ to about 99% v/v $H_2SO_4$. In a further embodiment, the mass percentage of sulfuric acid ranges from about 50% v/v $H_2SO_4$ to about 99% v/v $H_2SO_4$. In a further embodiment, the mass percentage of sulfuric acid ranges from about 55% v/v $H_2SO_4$ to about 99% v/v $H_2SO_4$. In a further embodiment, the mass percentage of sulfuric acid ranges from about 60% v/v $H_2SO_4$ to about 99% v/v $H_2SO_4$. In further embodiments, the mass percentage of sulfuric acid ranges from about 10% v/v $H_2SO_4$ to about 95% v/v $H_2SO_4$; from about 25% v/v $H_2SO_4$ to about 50% v/v $H_2SO_4$; or from about 10% v/v $H_2SO_4$ to about 40% v/v $H_2SO_4$.

In an embodiment of the present disclosure, the ultrasound-assisted extraction process comprises the concentration by gravity and/or magnetic extraction and leaching/sonication of scandium and/or vanadium valuables from a feedstock. In an embodiment of the present disclosure, the leaching is performed using sulfuric acid under sonication. In an embodiment, the sonication is performed at a frequency ranging from about 10 to about 50 kHz. In a further embodiment, the sonication is performed at a frequency ranging from about 20 to about 30 kHz.

In an embodiment of the present disclosure, the ultrasound-assisted extraction process comprises the concentration by gravity and/or magnetic extraction and leaching/sonication of scandium and/or vanadium valuables from a feedstock. In an embodiment of the present disclosure, the leaching is performed using sulfuric acid under sonication. In an embodiment of the present disclosure, the leaching/sonication is performed over a period ranging from about 5 to about 60 minutes. In a further embodiment of the present disclosure, the leaching/sonication is performed over a period ranging from about 10 to about 50 minutes. In a further embodiment of the present disclosure, the leaching/sonication is performed over a period ranging from about 15 to about 40 minutes. In a further embodiment of the present disclosure, the leaching/sonication is performed over a period ranging from about 20 to about 35 minutes.

Figure 2:
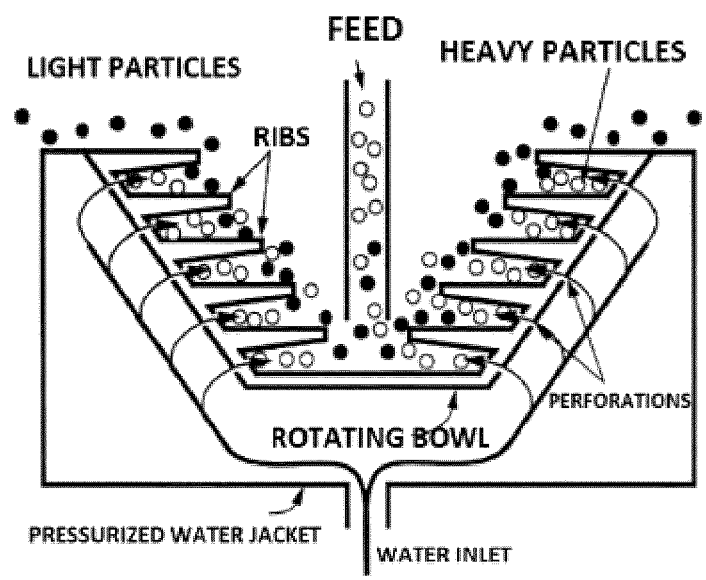
FIG. 2 is an illustration of a Knelson separator in accordance with an embodiment of the present disclosure.
Figure 3:
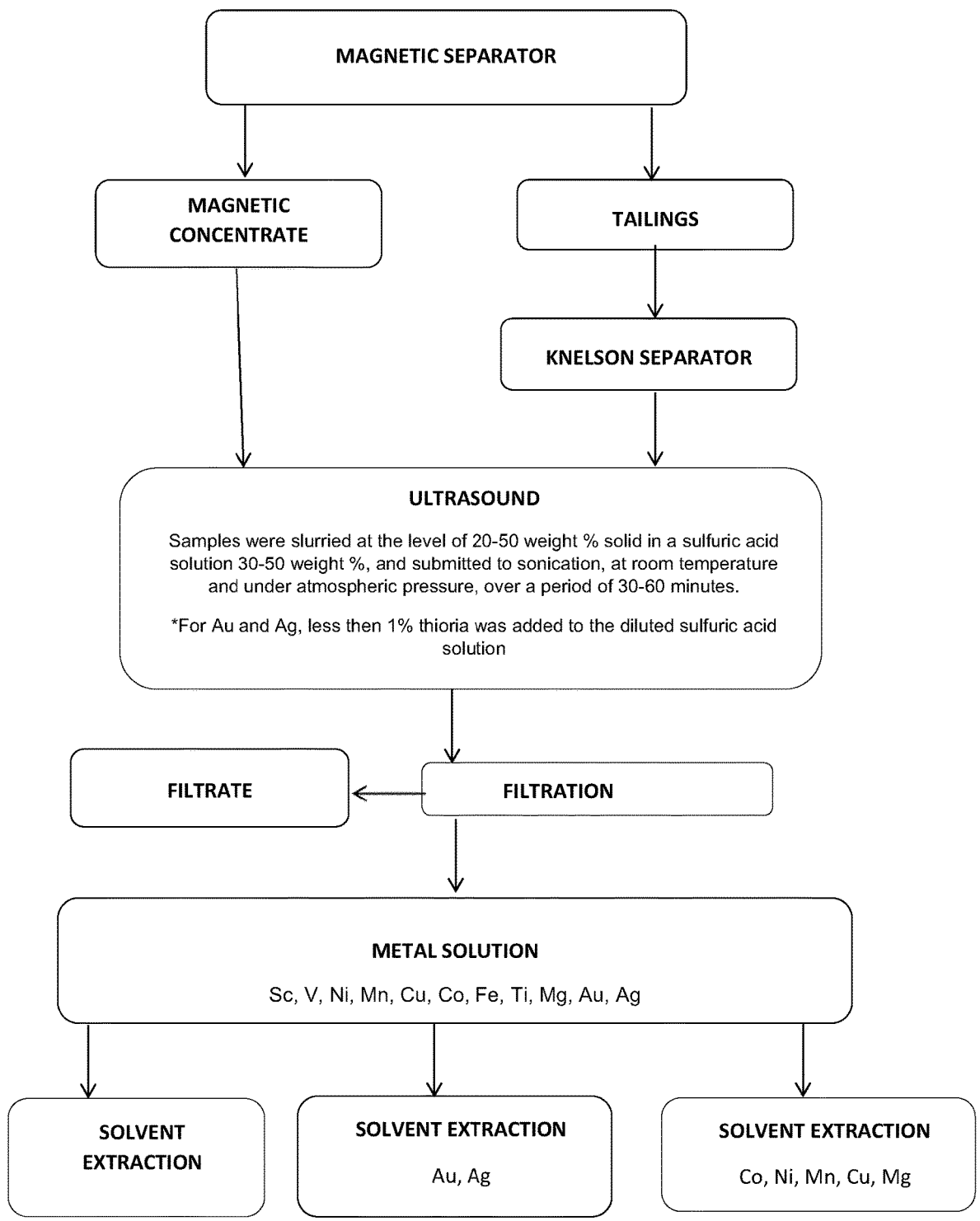
FIG. 3 is a flowchart illustrating the ultrasound-assisted extraction process of various valuables in accordance with an embodiment of the present disclosure.

In an embodiment of the present disclosure, a Knelson separator such as illustrated in FIG. 2 is used to capture values comprising heavy metals. The Knelson separator is a compact centrifugal separator comprising a fluidized bed. In an embodiment of the present disclosure, a centrifugal force of up to 90 g is applied on the particulate feedstock fed into the multi-level rotating bowl of the separator. A person skilled in the art would understand that various centrifugal forces can be applied and it is within their skill to do so.

The fluidized bed is generated by means of numerous perforations around the separating bowl of the Knelson separator. As the feed material (e.g. a slurry) is fed into the multi-level rotating bowl, the less dense material is pushed out while the heavier materials make their way toward the outer wall of the rotating bowl. Once the sample has been completely processed, the water source (e.g. pressurized water) is closed and the rotating bowl is stopped and emptied. In an embodiment of the present disclosure, the contents of the bowl are subsequently fed into a gravity separating unit called a "superspanner". In a particular embodiment of the present disclosure, the superspanner is used to determine the presence of free gold.

EXPERIMENTAL

A number of non-limiting examples are provided hereinbelow, illustrating the various steps of the ultrasound-assisted extraction process in accordance with various embodiments of the process of the present disclosure (Table 2).

Magnetic Separation

A Cajalbana feed material was upgraded by feeding the material as a slurry through a low intensity magnetic drum separator. A typical magnetic drum separator in accordance with an embodiment of the present disclosure is illustrated in FIG. 1. In an embodiment of the present disclosure, the low intensity magnetic drum separator (Eriez LWD Separator) comprises an electrically induced magnet generating a field of about 1000 gauss. A person skilled in the art would understand that various magnetic fields can be applied and it is within their skill to do so. The feed material was initially slurried in a 30 L tank equipped with a speed adjustable motor and impeller. The resulting slurry was then slowly pumped into the magnetic drum separator. Concentrates and tailings were subsequently discharged from the magnetic drum separator into separate drums, filtered, dried and weighed.

Sulfuric Acid Digestion (Leaching)—General Procedure

Leaching experiments were typically performed using 30 g of feed material and a 50% v/v $H_2SO_4$ solution. The ratio of sulfuric acid to feed material ranges from 10:1 to 1:1 by weight. In an embodiment, the sulfuric acid to feed material ratio was 5:1 by weight. A person skilled in the art would understand that various sulfuric acid to feed material ratios can be applied and it is within their skill to do so. The leaching experiments were typically performed at room temperature and under atmospheric pressure. The sonication of the leaching solution was performed using a Q700 sonicator operating at 20 KHz (700 W) and equipped with a titanium solid tip sonotrode (19 mm wide, 70 mm long) set at an amplitude of 60%. The power consumption was initially around 35 W and around 10 W towards the end of the leaching step. In an embodiment of the present disclosure, the leaching step was carried out over a period of one hour. A person skilled in the art would understand that various leaching/sonication times can be applied and it is within their skill to do so. By the end of the sonication/leaching step, the temperature of the sample had risen to about 70° C. The material was subsequently cooled to room temperature, followed by washing with water and filtration under vacuum. The elemental composition of the resulting material was determined by X-ray fluorescence analysis (XRF) using an S8 Tiger Series 2 WDXRF spectrometer from Brucker. The recovery efficiency of the valuables was determined by measuring the elemental composition of the feed material using the aforementioned S8 Tiger Series 2 WDXRF spectrometer from Brucker.

Guatemalan Ore

An ore from Guatemala (20 g; 20 wt %) comprising 0.0076% scandium, 0.65% manganese, 0.03% vanadium, 0.01% copper, 2.25% nickel, 0.05% cobalt, 56.32% iron (III) oxide and 0.04% titanium was leached with a 50% v/v $H_2SO_4$ solution. The resulting slurry was subsequently sonicated with stirring while at room temperature and under atmospheric pressure over a period of 60 minutes. By the end of the sonication/leaching step, the temperature of the sample had risen to about 70° C. The material was subsequently cooled to room temperature, followed by washing with water and filtration under vacuum. Elemental analysis confirmed that 100% of the scandium, 95.72% of the manganese, 73.55% of the vanadium, 89.29% of the copper, 94.71% of the nickel, 100% of the cobalt, 96.59% of the iron(III) oxide and 100% of the titanium values (obtained as the sulfates of these metals) were extracted.

An ore from Guatemala (20 g; 20 wt %) comprising 0.0076% scandium, 0.65% manganese, 0.03% vanadium, 0.01% copper, 2.25% nickel, 0.05% cobalt, 56.32% iron (III) oxide and 0.04% titanium was leached with a 30% v/v $H_2SO_4$ solution. The resulting slurry was subsequently sonicated with stirring while at room temperature and under atmospheric pressure over a period of 60 minutes. By the end of the sonication/leaching step, the temperature of the sample had risen to about 70° C. The material was subsequently cooled to room temperature, followed by washing with water and filtration under vacuum. Elemental analysis confirmed that 100% of the scandium, 97.37% of the manganese, 85.75% of the vanadium, 90.59% of the copper, 93.54% of the nickel, 97.43% of the cobalt, 96.60% of the iron(III) oxide and 78.63% of the titanium values (obtained as the sulfates of these metals) were extracted.

An ore from Guatemala (20 g; 20 wt %) comprising 0.0074% scandium, 1.34% manganese, 0.03% vanadium, 0.78% nickel, 0.1% cobalt, 84.7% iron(III) oxide and 0.007% titanium was leached with a 50% v/v $H_2SO_4$ solution. The resulting slurry was subsequently sonicated with stirring while at room temperature and under atmospheric pressure over a period of 30 minutes. By the end of the sonication/leaching step, the temperature of the sample had risen to about 70° C. The material was subsequently cooled to room temperature, followed by washing with water and filtration under vacuum. Elemental analysis confirmed that 100% of the scandium, 86.29% of the manganese, 51.97% of the vanadium, 77.37% of the nickel, 96.39% of the cobalt, 80.83% of the iron(III) oxide and 58.83% of the titanium values (obtained as the sulfates of these metals) were extracted.

Guatemalan Ore (M-7459-119)

An ore from Guatemala (100 g, 20 wt %) comprising 0.0076% scandium, 0.65% manganese, 0.03% vanadium, 0.01% copper, 2.25% nickel, 0.05% cobalt, 56.32% iron(III) oxide and 0.04% titanium was leached with a 30% v/v $H_2SO_4$ solution. The resulting slurry was subsequently sonicated with stirring while at room temperature and under atmospheric pressure over a period of 30 minutes. By the end of the sonication/leaching step, the temperature of the sample had risen to about 70° C. The material was subsequently cooled to room temperature, followed by washing with water and filtration under vacuum. Elemental analysis confirmed that 100% of the scandium, 46.38% of the manganese, 8.29% of the vanadium, 8.29% of the copper, 14.18% of the nickel and 81.66% of the cobalt values (obtained as the sulfates of these metals) were extracted.

Guatemalan Ore (M-7459-257)

An ore from Guatemala (15 g, 20 wt %) comprising 0.0074% scandium, 1.34% manganese, 0.03% vanadium, 0.78% nickel, 0.1% cobalt, 84.7% iron(III) oxide and 0.007% titanium was leached with a 50% v/v $H_2SO_4$ solution. The resulting slurry was subsequently sonicated with stirring while at room temperature and under atmospheric pressure over a period of 30 minutes. By the end of the sonication/leaching step, the temperature of the sample had risen to about 70° C. The material was subsequently cooled to room temperature, followed by washing with water and filtration under vacuum. Elemental analysis confirmed that 100% of the scandium, 79.63% of the manganese, 35.00% of the vanadium, 73.00% of the nickel, 92.20% of the cobalt, 82.18% of the iron(III) oxide and 61.00% of the titanium values (obtained as the sulfates of these metals) were extracted.

Guatemalan Ore (M-7459-257)

An ore from Guatemala (15 g, 20 wt %) comprising 0.39% manganese, 0.02% vanadium, 4.04% nickel, 0.02% cobalt, 38.34% iron(III) oxide and 0.03% titanium was leached with a 50% v/v $H_2SO_4$ solution. The resulting slurry was subsequently sonicated with stirring while at room temperature and under atmospheric pressure over a period of 30 minutes. By the end of the sonication/leaching step, the temperature of the sample had risen to about 70° C. The material was subsequently cooled to room temperature, followed by washing with water and filtration under vacuum. Elemental analysis confirmed that 95.33% of the manganese, 77.23% of the vanadium, 73.00% of the nickel, 93.58% of the cobalt, 95.45% the iron(III) oxide and 84.82% of the titanium values (obtained as the sulfates of these metals) were extracted.

Guatemalan Ore—Saprolite Mine (M-788 H-90)

An ore from Guatemala (20 wt %) comprising 0.23% manganese, 1.73% nickel, 0.03% cobalt, 16.06% iron(III) oxide and 0.01% titanium was leached with a 50% v/v $H_2SO_4$ solution. The resulting slurry was subsequently sonicated with stirring while at room temperature and under atmospheric pressure over a period of 60 minutes. By the end of the sonication/leaching step, the temperature of the sample had risen to about 70° C. The material was subsequently cooled to room temperature, followed by washing with water and filtration under vacuum. Elemental analysis confirmed that 100% of the manganese, 98.23% of the nickel, 100% of the cobalt, 97.77% the iron(III) oxide and 60.67% of the titanium values (obtained as the sulfates of these metals) were extracted.

Guatemalan Ore—Limonite Mine (M-7888 D-80)

An ore from Guatemala (20 wt %) comprising 0.02% scandium, 0.76% manganese, 0.04% vanadium, 1.11% nickel, 0.08% cobalt, 63.40% iron(III) oxide and 0.014% titanium was leached with a 50% v/v $H_2SO_4$ solution. The resulting slurry was subsequently sonicated with stirring while at room temperature and under atmospheric pressure over a period of 60 minutes. By the end of the sonication/leaching step, the temperature of the sample had risen to about 70° C. The material was subsequently cooled to room temperature, followed by washing with water and filtration under vacuum. Elemental analysis confirmed that 100% of the scandium, 96.47% of the manganese, 66.50% of the vanadium, 96.38% of the nickel, 97.40% of the cobalt, 80.88% the iron(III) oxide and 42.57% of the titanium values (obtained as the sulfates of these metals) were extracted.

Guatemalan Ore—Low grade stockpile (M-7888 A-38)

An ore from Guatemala (20 wt %) comprising 0.17% manganese, 0.007% copper, 0.96% nickel, 0.01% cobalt, 10.85% iron(III) oxide and 0.08% titanium was leached with a 50% v/v $H_2SO_4$ solution. The resulting slurry was subsequently sonicated with stirring while at room temperature and under atmospheric pressure over a period of 60 minutes. By the end of the sonication/leaching step, the temperature of the sample had risen to about 70° C. The material was subsequently cooled to room temperature, followed by washing with water and filtration under vacuum. Elemental analysis confirmed that 68.05% of the manganese, 99.36% of the copper, 77.37% of the nickel, 100% of the cobalt and 66.58% of the iron(III) oxide values (obtained as the sulfates of these metals) were extracted.

Cuban Ore

An ore from Cuba (100 g) comprising 0.007% scandium, 0.51% manganese, 0.04% vanadium, 0.02% copper, 0.07% cobalt, 71.4% iron(III) oxide and 2.70% magnesium was leached with a 25% v/v $H_2SO_4$ solution (200 mL). The resulting slurry was subsequently sonicated with stirring while at room temperature and under atmospheric pressure over a period of 60 minutes. By the end of the sonication/leaching step, the temperature of the sample had risen to about 70° C. The material was subsequently cooled to room temperature, followed by washing with water and filtration under vacuum. Elemental analysis confirmed that 100% of the scandium, 92.08% of the manganese, 72.47% of the vanadium, 81.65% of the copper, 84.54% of the nickel, 98.84% of the cobalt, 81.45% of the iron(III) oxide and 78.25% of the magnesium values (obtained as the sulfates of these metals) were extracted.

Cuban Ore—San Felipe (M-7459-15-29)

An ore from Cuba (20 wt %) comprising 0.875% manganese, 0.045% vanadium, 0.016% copper, 0.542% nickel, 0.078% cobalt, 54.88% iron(III) oxide and 0.396% titanium was leached with a 50% v/v $H_2SO_4$ solution. The resulting slurry was subsequently sonicated with stirring while at room temperature and under atmospheric pressure over a period of 30 minutes. By the end of the sonication/leaching step, the temperature of the sample had risen to about 70° C. The material was subsequently cooled to room temperature, followed by washing with water and filtration under vacuum. Elemental analysis confirmed that 97.44% of the manganese, 100% of the vanadium, 99.91% of the copper, 70.24% of the nickel and 100% of the cobalt values (obtained as the sulfates of these metals) were extracted.

Cuban Ore—San Felipe (M-7459-30-44)

An ore from Cuba (33 wt %) comprising 0.54% manganese, 0.022% vanadium, 0.00079% copper, 1.97% nickel, 0.039% cobalt, 46.02% iron(III) oxide and 0.018% titanium was leached with a 30% v/v $H_2SO_4$ solution. The resulting slurry was subsequently sonicated with stirring while at room temperature and under atmospheric pressure over a period of 30 minutes. By the end of the sonication/leaching step, the temperature of the sample had risen to about 70° C. The material was subsequently cooled to room temperature, followed by washing with water and filtration under vacuum. Elemental analysis confirmed that 64.71% of the manganese, 30.70% of the vanadium, 13.15% of the copper, 73.69% of the nickel and 60.91% of the cobalt values (obtained as the sulfates of these metals) were extracted.

Cuban Ore—Punta Gorda (M-7760)

An ore from Cuba (20 wt %) comprising 0.02% scandium, 0.87% manganese, 0.06% vanadium, 0.01% copper, 0.49% nickel, 0.1% cobalt, 77.1% iron(III) oxide and 0.012% titanium was leached with a 50% v/v $H_2SO_4$ solution. The resulting slurry was subsequently sonicated with stirring while at room temperature and under atmospheric pressure over a period of 60 minutes. By the end of the sonication/leaching step, the temperature of the sample had risen to about 70° C. The material was subsequently cooled to room temperature, followed by washing with water and filtration under vacuum. Elemental analysis confirmed that 100% of the scandium, 94.44% of the manganese, 85.77% of the vanadium, 100% of the copper, 93.61% of the nickel, 100% of the cobalt, 94.92% of the iron(III) oxide and 76.27% of the titanium values (obtained as the sulfates of these metals) were extracted.

Congolian Ore (M-7760)

An ore from Congo (20 wt %) comprising 1.49% manganese, 0.03% vanadium, 5.71% copper, 0.07% nickel, 9.38% cobalt, 2.74% iron(III) oxide and 0.002% titanium was leached with a 50% v/v $H_2SO_4$ solution. The resulting slurry was subsequently sonicated with stirring while at room temperature and under atmospheric pressure over a period of 60 minutes. By the end of the sonication/leaching step, the temperature of the sample had risen to about 70° C. The material was subsequently cooled to room temperature, followed by washing with water and filtration under vacuum. Elemental analysis confirmed that 98.72% of the manganese, 100% of the vanadium, 99.67% of the copper, 100% of the nickel and 99.12% of the cobalt, 97.91% of the iron(III) oxide and 4.85% of the titanium values (obtained as the sulfates of these metals) were extracted.

Ultrasound Assisted Extraction of Au and Ag

Au and/or Ag were selectively extracted from various solid feed materials, non-limiting examples of which include soil, sediments and silica ores. More specifically, Au and/or Ag were selectively extracted from feed materials obtained from the Aguamas and Campanillas mines in Sinaloa, Mexico.

Thiourea (<1%) was added to an aqueous sulfuric acid solution in order to effectively and selectively extract the Au and/or Ag values from the feed material. Following sonication/leaching, performed over a period of 1 hour, over 90% of the Au and over 80% of the Ag were recovered (Table 1). The extraction was performed at room temperature and under atmospheric pressure.

Leaching experiments were typically performed using 30 g of feed material and a 50-80% v/v $H_2SO_4$ solution. The ratio of sulfuric acid to feed material ranges from 10:1 to 1:1 by weight. In an embodiment, the sulfuric acid to feed material ratio was 5:1 by weight. A person skilled in the art would understand that various sulfuric acid to feed material ratios can be applied and it is within their skill to do so. The leaching experiments were typically performed at room temperature and under atmospheric pressure. The sonication of the leaching solution was performed using a Q700 sonicator operating at 20 KHz (700 W) and equipped with a titanium solid tip sonotrode (19 mm wide, 70 mm long) set at an amplitude of 60%. The power consumption was initially around 30 W and the total energy consumption varies between 135 to 145 KJoules. In an embodiment of the present disclosure, the leaching step was carried out over a period of one hour. A person skilled in the art would understand that various leaching/sonication times can be applied and it is within their skill to do so. By the end of the sonication/leaching step, the temperature of the sample had risen to about 40-100° C. The material was subsequently cooled to room temperature, followed by washing with water and filtration under vacuum. The elemental composition of the resulting material was determined by X-ray fluorescence analysis (XRF) using an S8 Tiger Series 2 WDXRF spectrometer from Brucker. The recovery efficiency of the valuables was determined by measuring the elemental composition of the feed material using the aforementioned S8 Tiger Series 2 WDXRF spectrometer from Brucker.

Aguamas Mine

An ore from the Aguamas mine (20 wt %) comprising 0.01% Au and 0.08% Ag was leached with a 80% v/v $H_2SO_4$ solution. The resulting slurry was subsequently sonicated with stirring while at room temperature and under atmospheric pressure over a period of 60 minutes. By the end of the sonication/leaching step, the temperature of the sample had risen. The material was subsequently cooled to room temperature, followed by washing with water and filtration under vacuum. Elemental analysis confirmed that 98% of the Au and 88.76% of the Ag were extracted. The subsequent recovery of the Au and Ag values was achieved by solvent extraction or by ion exchange extraction using a suitable resin.

Campanillas Mine

An ore from the Campanillas mine (20 wt %) comprising 0.05% Au and 0.05% Ag was leached with a 50% v/v $H_2SO_4$ solution. The resulting slurry was subsequently sonicated with stirring while at room temperature and under atmospheric pressure over a period of 60 minutes. By the end of the sonication/leaching step, the temperature of the sample had risen. The material was subsequently cooled to room temperature, followed by washing with water and filtration under vacuum. Elemental analysis confirmed that 98% of the Au and 87.47% of the Ag were extracted. The subsequent recovery of the Au and Ag values was achieved by solvent extraction or by ion exchange extraction using a suitable resin.

Indeed, more than 99% of the vanadium content in the pregnant solution was selectively adsorbed with only negligible amounts of scandium, iron oxides, aluminum, calcium, sodium and magnesium. A person skilled in the art would understand that other extraction conditions can be applied and it is within their skill to do so. For example, other macroporous basic anion-exchange resins are within the purview of the skilled artisan.

Figure 4:
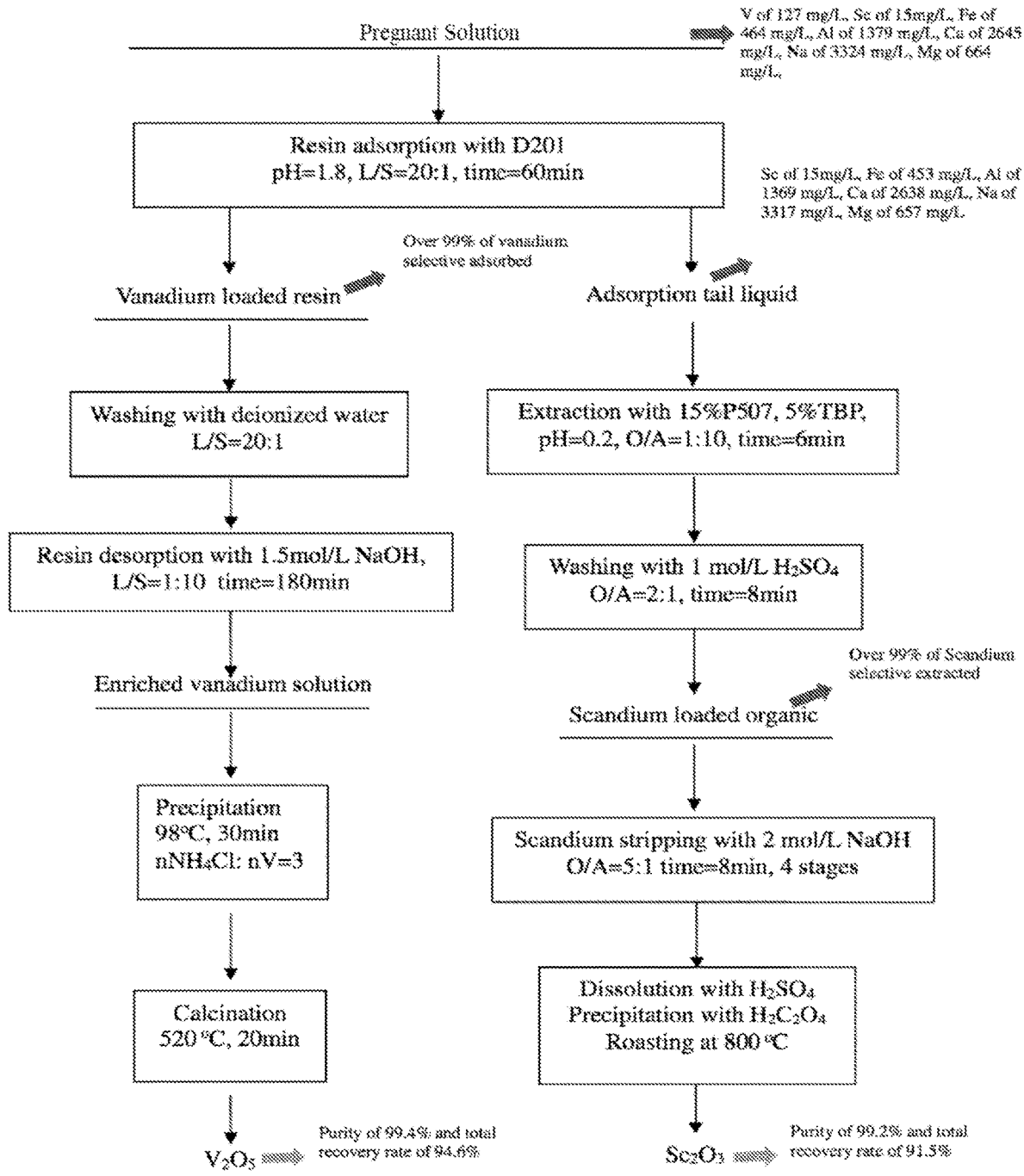
FIG. 4 is a flowchart illustrating the solvent extraction process of various valuables in accordance with an embodiment of the present disclosure.

Scandium could subsequently be selectively extracted over iron oxides, aluminum, calcium, sodium, and magnesium from the adsorption tail liquid obtained following the removal of the vanadium values. To that effect, the use of 15% P507 and a pH of about 0.2 were determined to provide for optimal results. Indeed, more than 99% of the scandium content in the adsorption tail liquid was extracted along with minimal amounts of iron oxides and aluminum (<10% iron oxides and aluminum). Substantially all of the impurities could be removed by washing with an aqueous solution of sulfuric acid (0.3 mol/L). High-purity $V_2O_5$ and $Sc_2O_3$ was obtained following desorption or stripping, precipitation, and roasting (FIG. 4).

TABLE 2

Ultrasound-assisted extraction process on various mining samples.

| Sample | Recovery of Scandium (%) | Recovery of Cobalt (%) | Recovery of Nickel (%) | Recovery of Manganese (%) | Recovery of Copper (%) | Recovery of Vanadium (%) | Recovery of Magnesium (%) |
|---|---|---|---|---|---|---|---|
| Guatemala M-7459 (50%)(1 h) | 94.78 | 100.00 | 94.71 | 95.72 | 89.29 | 73.55 | 65.39 |
| Guatemala M-7459 (30%)(1 h) | 94.38 | 97.44 | 93.54 | 97.37 | 90.60 | 85.76 | 56.91 |
| Guatemala M-7459 (50%) (30 minutes) | 95.13 | 96.40 | 77.37 | 86.29 | N/A | 51.97 | N/A |
| Cuba Cajalbana, Cuba | 100.00 | 98.85 | 84.55 | 92.08 | 81.65 | 72.48 | 78.25 |
| Cuba M-7459 | N/A | 100.00 | 89.72 | 98.27 | N/A | 100.00 | 75.95 |
| Cuba M-7459 | N/A | 100.00 | 89.18 | 87.89 | N/A | 49.28 | 90.37 |
| Guatemala M-7459 | 100.00 | 81.66 | 14.81 | 46.38 | 8.29 | 8.29 | 5.24 |
| Guatemala M-7459 (15 g)(50%) | 100.00 | 92.20 | 73.00 | 79.63 | N/A | 35.00 | N/A |
| Guatemala M-745 (15 g)(50%) | N/A | 89.53 | 93.58 | 95.33 | N/A | 77.23 | 84.52 |
| Congo M-7760 | N/A | 99.12 | 100.00 | 98.72 | 99.67 | 100.00 | 100.00 |
| Cuba M-7760 Punta Gorda | 100.00 | 100.00 | 93.61 | 94.44 | 100.00 | 85.77 | 89.41 |
| Guatemala M-7888 H-90 | N/A | 100.00 | 98.23 | 100.00 | N/A | N/A | 99.28 |
| Guatemala M-7888 D-80 | 100.00 | 97.40 | 96.38 | 96.47 | N/A | 66.50 | 94.38 |
| Guatemala M-7888 A-28 | N/A | 100.00 | 77.37 | 68.05 | 99.36 | N/A | 77.67 |

TABLE 1

Au and Ag Recovery from samples from the Aguamas and Campanillas mines in Sinaloa, Mexico

| | Au (%) | Ag (%) |
|---|---|---|
| Aguamas | 98.0 | 88.76 |
| Campanillas | 98.0 | 87.47 |

Selective Extraction of Values from Pregnant Leaching Solutions

The selective separation of vanadium and scandium values from a pregnant solution was investigated. D201 resin and P507 extractant (an organophosphoric extractant) were determined to be efficient for the aforementioned purpose. Vanadium could be selectively adsorbed over the other values (e.g. scandium, iron oxides, aluminum, calcium, sodium, and magnesium) comprised in the pregnant leaching solution. To that effect, a pH of about 1.8; a volume ratio of leaching solution to resin of 20:1; and a flow rate of about 3.33 mL/min were determined to provide for optimal results.

While the present disclosure has been described with reference to what are presently considered to be the preferred examples, it is to be understood that the disclosure is not limited to the disclosed examples. To the contrary, the disclosure is intended to cover various modifications and equivalent arrangements included within the spirit and scope of the appended claims.

The invention claimed is:

1. A process for the selective recovery of scandium and vanadium values from an ore material, the process comprising:
   leaching the ore material in a sulfuric acid solution while simultaneously sonicating the sulfuric acid solution thereby producing a pregnant solution; and
   selectively removing scandium and vanadium compounds from the pregnant solution.

2. The process of claim 1, further comprising subjecting the pregnant solution to a solvent extraction process producing a pregnant solution enriched in scandium and vanadium values.

3. The process of claim 2, further comprising subjecting the pregnant solution enriched in scandium and vanadium values to a macroporous basic anion-exchange resin for selectively removing the scandium compounds.

4. The process of claim 2, wherein the solvent extraction process comprises the use of an organophosphoric extractant.

5. The process of claim 4, wherein the organophosphoric extractant comprises at least one of 2-ethylhexyl phosphoric acid mono-2-ethylhexyl ester (P507), di(2-ethylhexyl) phosphoric acid (P204), di(2-ethylhexyl) phosphinic acid (P227), and bis(2,4,4-trimethylpentyl) phosphinic acid (Cyanex 272).

6. The process of claim 1, wherein the ore material comprises limonite, saprolite, serpentine, laterite, hematite, magnetite, wustite, siderite, ankerite and/or taconite materials.

7. The process of claim 1, wherein the ore material comprises scandium and/or vanadium in various oxidation states.

8. The process of claim 1, wherein the sulfuric acid leaching comprises using an aqueous solution of sulfuric acid having a mass percentage from about 5 wt. % $H_2SO_4$ to about 100 wt. % $H_2SO_4$.

9. The process of claim 1, wherein the sulfuric acid leaching comprises using an aqueous solution of sulfuric acid having a mass percentage from about 10 wt. % $H_2SO_4$ to about 99 wt. % $H_2SO_4$.

10. The process of claim 1, wherein the sonication is performed at a frequency ranging from about 10 to about 50 kHz.

11. The process of claim 1, wherein the sonication is performed at a frequency ranging from about 20 to about 30 kHz.

12. The process of claim 1, wherein the leaching and sonication are performed over a period ranging from about five (5) minutes up to about sixty (60) minutes.

13. The process of claim 1, wherein the leaching and sonication are performed over a period ranging from about ten (5) minutes up to about fifty (50) minutes.

14. The process of claim 1, wherein the ore material is ground to a particle size of less than about 0.500 millimeter.

15. The process of claim 1, wherein the ore material is ground to a particle size of less than about 0.125 millimeter.

16. The process of claim 1, wherein the leaching and sonication are performed at atmospheric pressure at about room temperature.

17. The process of claim 1, wherein the leaching and sonication are performed with a solution of sulfuric acid (S) and a mass of ore material (M) having a mass ratio (S-to-M) not exceeding twenty to one (20:1 or 20 kg/kg).

18. The process of claim 1, wherein the pregnant solution is at a pH below 2.0.

19. A process for the selective recovery of scandium values from an ore material, the process comprising leaching the ore material in a sulfuric acid solution while simultaneously sonicating the sulfuric acid solution for a time sufficient to produce a pregnant solution substantially enriched in scandium.

* * * * *